United States Patent [19]

Ohwada et al.

[11] Patent Number: 4,923,929
[45] Date of Patent: May 8, 1990

[54] PROCESS FOR PRODUCING GRAFT COPOLYMER

[75] Inventors: Takeo Ohwada, Ibaraki; Kengo Kobayashi, Hitachi, both of Japan

[73] Assignee: Hitachi Chemical Co., Tokyo, Japan

[21] Appl. No.: 61,081

[22] Filed: Jun. 12, 1987

[30] Foreign Application Priority Data

Jun. 13, 1986 [JP] Japan .................................. 61-138724

[51] Int. Cl.$^5$ ........................ C08F 255/02; C08L 75/04
[52] U.S. Cl. ....................................... 525/126; 525/127; 525/129; 525/454; 525/455; 525/460; 525/920
[58] Field of Search ............... 525/126, 127, 129, 454, 525/455, 460, 920

[56] References Cited

U.S. PATENT DOCUMENTS

| | | | |
|---|---|---|---|
| 3,090,664 | 5/1963 | Cline et al. | 522/141 |
| 3,107,206 | 10/1963 | Cottet et al. | 522/141 |
| 3,488,268 | 1/1970 | Tannor | 522/141 |

FOREIGN PATENT DOCUMENTS 0166926 1/1986 European Pat. Off. .
2453871 4/1980 France .

OTHER PUBLICATIONS

Chemical Abstracts, vol. 104, No. 24, Jun. 1986, pp. 89, 90, abstract No. 208946m, Columbus, Ohio, U.S.; JP-A-60 245 552, (Nippon Carbide Industries Co., Inc.), 05-12-1985.

*Primary Examiner*—Ana L. Carrillo
*Attorney, Agent, or Firm*—Antonelli, Terry & Wands

[57] ABSTRACT

A graft copolymer produced by polymerizing an ethylenically unsaturated monomer in the presence of a fluorine-containing resin having reactive double bonds via a urethane linkage is excellent in transparency and pigment dispersibility and can provide a coating composition excellent in weather resistance.

10 Claims, No Drawings

PROCESS FOR PRODUCING GRAFT COPOLYMER

BACKGROUND OF THE INVENTION

This invention relates to a process for producing a graft copolymer by reacting an ethylenically unsaturated monomer with a fluorine-containing resin.

Recently, from the viewpoint of saving resources and saving energy, there have strongly been desired coating compositions excellent in weather resistance, that is, providing maintenance-free coating film even in paint industry. Heretofore, acrylic resins have been used in fields wherein weather resistance is required, but a further improvement is required now.

Further, the acrylic resins have defects in that they are generally poor in drape with pigments having higher oil absorbing properties, particularly they are remarkably poor in pigment dispersion as to carbon black and the like pigments, they require a longer time to obtain uniform dispersion, they cause pigment separation during storage, and the like. In order to improve the pigment dispersibility, it is proposed to synthesize an acrylic resin in the presence of an alkyd resin having unsaturated carbon-carbon double bonds. The resulting resin is improved in the pigment dispersibility but inferior in weather resistance and chemical resistance to the acrylic resins before modified.

On the other hand, there are known fluorine-containing copolymers having as essential components fluoroolefin, hydroxyalkyl vinyl ether, alkyl vinyl ether and cyclohexyl vinyl ether. These fluorine-containing copolymers are excellent in weather resistance, but poor in pigment dispersibility and initial gloss. In order to improve such defects, it is proposed to produce a graft copolymer by polymerizing an ethylenically unsaturated monomer in the presence of a fluorine-containing copolymer mentioned above to which reactive carbon-carbon double bonds were introduced (Japanese Patent Unexamined Publication No. 59-41315). The resulting graft copolymer is excellent in the weather resistance, pigment dispersibility and initial gloss, but has defects in that it is insufficient in compatibility with the ethylenically unsaturated monomer and its polymer, the graft copolymer solution is often clouded, the pigment can disperse but is easily separated from the resin component, and the like.

SUMMARY OF THE INVENTION

It is an object of this invention to provide a process for producing a graft copolymer excellent in weather resistance as well as transparency and pigment dispersibility.

This invention provides a process for producing a graft copolymer which comprises polymerizing 99.5 to 0.5% by weight of an ethylenically unsaturated monomer (B) copolymerizable with double bonds of the following resin (A) in the presence of 0.5 to 99.5% by weight of a fluorine-containing resin(A) having reactive double bonds via a urethane linkage in an amount of 0.001 to 0.025 mole per 100 g of the resin (A).

DESCRIPTION OF THE PREFERRED EMBODIMENTS

The fluorine-containing resin, the component (A), should have reactive double bonds in an amount of 0.001 to 0.025 mole, preferably 0.002 to 0.015 mole, per 100 g of the resin (A). When the amount is less than 0.001 mole, the graft polymerization becomes difficult when polymerized together with the component (B). On the other hand, when the amount is more than 0.025 mole, gelation easily takes place during the polymerization. The double bonds should be bonded via a urethane linkage. By taking such a structure, the graft copolymer obtained is excellent in the transparency and pigment dispersibility.

As the component (A), it is preferable to use a fluorine-containing resin having a weight average molecular weight of about 1000 to 200,000, more preferably about 10,000 to 100,000. When the molecular weight is too low, there is a tendency to lower the weather resistance and chemical resistance. On the other hand, when the molecular weight is too high, there is a tendency to easily bring about gelation at the time of reacting the component (A) with a isocyanate group-containing polymerizable adduct, or at the time of polymerizing the component (B).

The fluorine-containing resin, the component (A), can be produced by reacting a fluorine-containing copolymer having hydroxyl groups mentioned below with a polyvalent isocyanate compound having two or more isocyanate groups, and an ethylenically unsaturated monomer having one or more hydroxyl groups. In this process, it is preferable to react the polyvalent isocyanate compound with the hydroxyl group-containing ethylenically unsaturated monomer to prepare an isocyanate group-containing polymerizable adduct, which is then reacted with the fluorine-containing copolymer having hydroxyl groups.

As the polyvalent isocyanate, there can be used compounds having two or more isocyanate groups such as hexamethylene diisocyanate, tolylene diisocyanate, xylylene diisocyanate, isophorone diisocyanate, lysine diisocyanate, diphenylmethane diisocyanate, 2,2,4-trimethylhexamethylene diisocyanate, cyclohexylmethane diisocyanate, methylcyclohexane diisocyanate, isopropylidene bis(4-cyclohexylisocyanate), hexamethylene diisocyanate derivatives, a trimer of isophorone diisocyanate containing an isocyanurate ring, etc. Among them, preferable ones are diisocyanate compounds having isocyanate groups with different reactivity such as 2,2,4-trimethylhexamethylene diisocyanate, tolylene diisocyanate, etc.

As the hydroxy group-containing ethylenically unsaturated monomer, it is preferable to use an ethylenically unsaturated monomer having one hydroxyl group. Examples of such a monomer are hydroxyalkyl acrylates such as 2-hydroxyethyl acrylate, 2-hydroxypropyl acrylate, 2-hydroxybutyl acrylate, etc.; hydroxyalkyl methacrylates such as 2-hydroxyethyl methacrylate, 2-hydroxypropyl methacrylate, 2-hydroxybutyl methacrylate, etc.; N-methylolacrylamide, N-methylolmethacrylamide, etc.

It is preferable to react the polyvalent isocyanate with the hydroxy group-containing ethylenically unsaturated monomer in amounts of 1.0/0.5 to 1.0/0.7 in equivalent weight ratio in terms of isocyanate group of the former/hydroxyl group of the latter. Unreacted hydroxyl group-containing ethylenically unsaturated monomer may be retained in the reaction system. The reaction temperature is usually 0 to 150° C., preferably 40 to 100° C. In the reaction, it is possible to use a urethane reaction catalyst such as dibutyl tin dilaulate, or the like. Further, it is possible to use a polymerization inhibitor such as bis(2-hydroxy-3-tert-butyl-5- phenyl)methane, hydroquinone, etc. The reaction is preferably carried out in a suitable organic solvent. As the solvent, there can be used methyl ethyl ketone, methyl isobutyl ketone, ethyl acetate, butyl acetate, Cellosolve acetate, etc.

The fluorine-containing resin used as the component (A) can also be produced by reacting a hydroxyl group-containing fluorine-containing copolymer with the above-mentioned isocyanate group-containing polymerizable adduct. The polymerizable adduct can be obtained by reacting so as to have 0.001 to 0.025 mole of double bond per 100 g of the hydroxyl group-containing fluorine-containing copolymer. The reaction is preferably carried out at a temperature of 20 to 150° C., preferably 40 to 100° C., in an atmosphere or in a stream of an inert gas such as a nitrogen gas The reaction time is preferably from 30 minutes to 5 hours. In the reaction, it is possible to use the above-mentioned urethane reaction catalyst and polymerization inhibitor. The reaction is preferably carried out in the solvent mentioned above.

The fluorine-containing resin used as the component (A) can further be obtained by reacting a hydroxyl group-containing fluorine-containing copolymer with an isocyanate group-containing ethylenically unsaturated monomer. The reaction can be carried out in the same manner a mentioned above.

As the isocyanate group-containing ethylenically unsaturated monomer, there can be used isocyanoalkyl acrylates such as isocyanomethyl acrylate, isocyanoethyl acrylate, isocyanobutyl acrylate, etc.; isocyanoalkyl methacrylates, such as isocyanomethyl methacrylate, isocyanoethyl methacrylate, isocyanobutyl methacrylate, etc.

The hydroxyl value (or number) of the hydroxyl group-containing fluorine-containing copolymer is usually 0.57 to 250, preferably 3 to 120. When the hydroxyl number is too small, the introduction of double bonds becomes insufficient. On the other hand, when the hydroxyl number is more than 250, turbidity takes place when dissolved in a solvent to readily lower water resistance of a coating film obtained therefrom. The copolymer preferably contains the fluorine in an amount of 1 to 60% by weight.

Examples of the fluorine-containing copolymer as those obtained by copolymerizing a fluoroolefin, for example, a fluoroethylene such as monofluoroethylene, difluoroethylene, chlorotrifluoroethylene, tetrafluoroethylene, 1,1-bis(trifluoromethyl)ethylene, or the like; hydroxyethyl vinyl ether, hydroxypropyl vinyl ether, hydroxybutyl vinyl ether, hydroxypentyl vinyl ether, hydroxyhexyl vinyl ether and the like hydroxyalkyl vinyl ether wherein one or more hydrogen atoms in the alkyl or vinyl group are replaced by one or more fluorine atoms; ethyl vinyl ether, propyl vinyl ether, butyl vinyl ether, hexyl vinyl ether or the like alkyl vinyl ether wherein one or more hydrogen atoms in the alkyl or vinyl group are replaced by one or more fluorine atoms; or cyclohexyl vinyl ether or the like cycloalkyl vinyl ether wherein one or more hydrogen atoms in the alkyl or vinyl group are replaced by one or more fluorine atoms.

Examples of hydroxyalkyl vinyl ethers wherein one or more hydrogen atoms in the alkyl or vinyl group are replaced by one or more fluorine atoms are $CF_2=CF\text{-}O\text{-}CH_2OH$, $CF_2=CF\text{-}O\text{-}CF_2\text{-}CH_2OH$, $CF_2=CF\text{-}O\text{-}(CF_2)_2\text{-}OH$, etc.

The above-mentioned copolymer may contain as other copolymerizable compounds ethylene, propylene, isobuytylene, vinyl chloride, vinylidene chloride, vinyl acetate, n-vinyl lactate, methyl methacrylate, ethylenically unsaturated monomers having at least one carboxyl group such as unsaturated acids such as maleic acid, fumaric acid, acrylic acid, methacrylic acid, etc., carboxyalkyl vinyl ethers such as carboxyethyl vinyl ether, carboxypropyl vinyl ether, etc., or fluorine-substituted compounds thereof, and carboxyalkyl oxyalkylvinyl ethers or fluorine-substituted compounds thereof.

In the above-mentioned copolymer, it is preferable to use the fluoroethylene so as to be contained in an amount of 40 to 60% by mole, and to use the hydroxyalkyl vinyl ether so as to make the hydroxyl number 0.57 to 250, particularly preferably 3 to 120, and to make the acid number of the carboxyl group 0 to 20, particularly preferably 1.0 to 10. When the content of fluoroethylene is too small, the improvement in weather resistance is insufficient, whereas when the content is too much, there bring about difficult problems in industrial production. When the hydroxyl number is less than 0.57, the introduction of double bonds becomes insufficient, whereas when the hydroxyl number is over 250, the solubility in an organic solvent is readily limited due to an increased use amount of the hydroxyalkyl vinyl ether. From the viewpoint of the solubility in the organic solvent, it is preferable to use the hydroxyalkyl vinyl ether in an amount of 15% by mole or less. On the other hand, when the acid number is more than 20, the solubility in the organic solvent is readily limited.

It is preferable to use a cycloalkyl vinyl ether and an alkyl vinyl ether as a total in an amount of 5 to 60% by mole in the fluorine-containing copolymer used as the component (A). When the amount of the cycloalkyl vinyl ether and the alkyl vinyl ether is too small, the above-mentioned copolymer becomes difficult to be dissolved in an organic solvent. On the other hand, when the amount is too much, the using amount of the fluoroolefin or hydroxyalkyl vinyl ether undesirably decreases. It is particularly preferable to use cyclohexyl vinyl ether and alkyl vinyl ether so as to make the content 5 to 45% by mole, respectively. It is preferable to use other components in amounts of 30% by mole or less.

As the component (B), there can be used at least one ethylenically unsaturated monomer copolymerizable with the double bonds of the component (A). Examples of the component (B) are alkyl acrylates such as methyl acrylate ethyl acrylate, butyl acrylate, isopropyl acrylate, 2-ethylhexyl acrylate, etc.; alkyl methacrylates such as methyl methacrylate, ethyl methacrylate, butyl methacrylate, isopropyl methacrylate, 2-ethylhexyl methacrylate, etc.; styrene or styrene derivatives such as vinyltoluene, α-methylstyrene, chlorostyrene, etc.; acrylonitrile, methacrylonitrile, vinyl chloride, vinyl acetate, dialkyl maleates such as dimethyl maleate, etc. It is also possible to use polymerizable monomer having one or more hydroxyl groups such as hydroxyalkyl acrylates, e.g., 2-hydroxyethyl acrylate, 2-hydroxypropyl acrylate, 2-hydroxybutyl acrylate, etc.; hydroxyalkyl methacrylates, e.g., 2-hydroxyethyl methacrylate, 2-hydroxypropyl methacrylate, 2-hydroxybutyl methacrylate, etc.; monoacrylates or monomethacrylates of polyhydric alcohols, e.g., glycerin, trimethylolpropane, etc.; N-methylolacrylamide, N-methylolmethacrylamide, or alkyletherified compounds thereof, etc. If necessary, it is possible to use unsaturated amides such as acrylamide, methacrylamide, etc.; polymerizable monomers having an oxirane group such as glycidyl methacrylate, glycidyl acrylate, etc.; α,β-unsaturated carboxylic acids and alkyl esters thereof such as acrylic acid, methacrylic acid, monoalkyl maleate, etc.

When the contents of the unsaturated amide and the polymerizable monomer having an oxirane group are too much, there is a tendency to lower water resistance of coating film produced therefrom or the kind of reaction solvent is limited. Thus, these monomers are preferably used in amounts of 30% by weight or less based on the total weight of the components (A) and (B). Further, when the content of the α,β-unsaturated carboxylic acid is too much, there is a tendency to lower water resistance of the coating film. Therefore, it is preferable to use the α,β-unsaturated carboxylic acid in an amount of 10% by weight or less based on the total weight of the components (A) and (B).

The graft copolymer can be obtained by polymerizing the component (A) in the presence of the component (B) using the component (A) in an amount of 0.5 to 99.5% by weight and the component (B) in an amount of 99.5 to 0.5% by weight. If the weight ratio of the components (A)/(B) is less than 0.5/99.5, the weather resistance and chemical resistance of the coating film are lowered, whereas the ratio is more than 99.5/0.5, dispersibility of pigment, drying properties, compatibility with other resins are lowered. It is preferable to use the components (A) and (B) in amounts of 10 to 90% by weight and 90 to 10% by weight, respectively.

The hydroxyl number of the graft copolymer can be adjusted by controlling the hydroxyl number of the component (A) and using amount thereof, and the using amount of the hydroxyl group-containing polymerizable monomer used in the component (B). The acid value (or number) of the graft copolymer can be adjusted by controlling the acid number of the component (A) and the using amount of α,β-unsaturated carboxylic acid in the component (B).

The polymerization of the component (B) in the presence of the component (A) can be carried out, if desired, by using an organic solvent such as toluene, xylene, methyl isobutyl ketone, butyl acetate, ethyl acetate, Cellosolve acetate, butyl Cellosolve, 1-butanol, 2-butanol, 1-propanol, 2-propanol, etc., as a reaction solvent, and a polymerization initiator. Examples of the polymerization initiator are peroxides such as benzoyl peroxide, di-tert-butyl peroxide, cumen hydroperoxide, etc.; azobis compounds such as azobisisobutyronitrile, etc. The polymerization can be carried out at 50 to 200° C. for 1 to 10 hours with heating. The reaction is preferably carried out in an atmosphere or in a stream of an inert gas such as nitrogen gas. In order to make the amount of unreacted monomer smaller, it is preferable to use both an azobis compound and a peroxide together.

The graft copolymer thus produced can be used as a lacquer composition by dissolving it in an organic solvent, or as a curing type coating composition by properly combining with a curing agent known as a curing agent for acrylic resin coating compositions. In the case of using the graft copolymer as a coating composition as mentioned above, it is possible to add inorganic pigments such as titanium white, cadmium yellow, carbon black, etc., organic pigments such as phthalocyanine series pigments, azo series pigments, etc., depending on purposes. If necessary, the coating composition may contain one or more antioxidants, ultraviolet absorbers, photo stabilizers, pigment dispersants and the like additives. These pigments are preferably used by well kneading with the graft copolymer previously. The resulting coating composition is suitable for coating wood, metals, slates, roof tiles, etc.

As the organic solvent for use in the coating composition, those used for the graft polymerization can be used. The solid resin content in the coating composition can be changed depending on purposes, and preferably in the range of 20 to 50% by weight.

This invention is illustrated by way of the following Examples, in which all parts and percents are by weight unless otherwise specified.

SYNTHESIS EXAMPLE 1

In a flask equipped with a thermometer, a stirrer, a nitrogen introducing pipe and a reflux condenser, 210 parts of 2,2,4-trimethylhexamethylene diisocyanate, 110.6 parts of methyl ethyl ketone, 0.166 part of dibutyl tin dilaulate, and 0.332 part of bis(2-hydroxy-3-tert-butyl-5-ethylphenyl)methane [a polymerization inhibitor] were placed and heated at 60° C. After adding 121.8 parts of 2-hydroxyethyl acrylate dropwise uniformly over 1 hour, the reaction was carried out at 60° C. for 2 hours to synthesize a polymerizable adduct having an isocyanate group. The obtained solution had a solid content of 70%. The content of the isocyanate group in the polymerizable adduct was 9%.

SYNTHESIS EXAMPLES

In a flask equipped with a thermometer, a stirrer, and a reflux condenser, 100 parts of xylene solution of a hydroxyl group-containing fluorine-containing copolymer [hydroxyl number 47; acid number 5; fluorine content about 27%, weight average molecular weight about 80,000 (gel permeation analysis: converted to standard polystyrene), a copolymer containing trifluoroethylene and a hydroxyalkyl vinyl ether, the trifluoroethylene content about 50% by mole], the xylene solution having a solid content of 50%, a specific gravity of 1.4 (g/cm$^3$), a viscosity of about 800 cps (at room temperature) and using LUMIFLON LF-400 (a trade name, mfd. by Asahi Glass Co., Ltd.), 0.67 part of the isocyanate group-containing polymerizable adduct solution obtained in Synthesis Example 1 [0.47 part in terms of solid content], and 0.33 part of xylene were placed and reacted at 80° C. for 1 hour to yield a fluorine-containing resin solution (solid content 50%) having reactive double bonds via a urethane linkage in an amount of 0.003 mole per 100 g of the resin. The resin solution had a hydroxyl number of 23.

SYNTHESIS EXAMPLE 3

A hydroxyl group-containing fluorine-containing copolymer (fluorine content about 41%, hydroxyl number 43, acid number 0, weight average molecular weight about 120,000 (gel permeation analysis, converted to standard polystyrene), a copolymer of chlorotrifluoroethylene, hydroxyalkyl vinyl ether and fluorine atom-substituted hydroxyalkyl vinyl ether) dissolved in a mixed solvent of butyl acetate, ethyl acetate, methyl isobutyl ketone, toluene and xylene [solid content 50%, specific gravity 1.15 (g/cm$^3$), a viscosity about 1000 cps (at room temperature)] in an amount of 100 parts, 0.67 parts of the isocyanate group-containing polymerizable adduct solution obtained in Synthesis Example 1, and 0.16 part of xylene were reacted in the same manner as described in Synthesis Example 2 to yield a fluorine-containing resin solution (solid content 50%) having reactive double bonds via a urethane linkage in an amount of 0.003 mole per 100 g of the resin. The resin solution had a hydroxyl number of 21.

benzoyl peroxide to further react at 110° C. for 2 hours with heating. To the resulting copolymer, xylene was added to adjust the solid content properly. The obtained copolymer solutions had a solid content and an acid number as shown in Tables 1 and 2.

TABLE 1

| | | Example No. | | | | | |
|---|---|---|---|---|---|---|---|
| | | 1 | 2 | 3 | 4 | 5 | 6 |
| Ingredients | Resin solution obtained in Synthesis Example 2 | 20* | 50* | 80* | — | — | — |
| | Resin solution obtained in Synthesis Example 3 | — | — | — | 20* | 50* | 80* |
| | Methyl methacrylate | 20 | 12.5 | 5 | 20 | 12.5 | 5 |
| | Butyl methacrylate | 60 | 37.5 | 15 | 60 | 37.5 | 15 |
| | Azobisisobutyro-nitrile (initiator) | 1.28 | 0.8 | 0.32 | 1.28 | 0.8 | 0.32 |
| | Xylene | 50 | 50 | 50 | 50 | 50 | 50 |
| Properties | Solid content (%) | 40.1 | 40.0 | 39.9 | 40.0 | 39.9 | 40.1 |
| | Acid number | 0.5 | 1.3 | 2.0 | 0 | 0 | 0 |

(Note) *in solid content

TABLE 2

| | | Comparative Example No. | | | | | |
|---|---|---|---|---|---|---|---|
| | | 1 | 2 | 3 | 4 | 5 | 6 |
| Ingredients | Resin solution obtained in Synthesis Example 4 | 20* | 50* | 80* | — | — | — |
| | Resin solution obtained in Synthesis Example 5 | — | — | — | 20* | 50* | 80* |
| | Methyl methacrylate | 20 | 12.5 | 5 | 20 | 12.5 | 5 |
| | Butyl methacrilate | 60 | 37.5 | 15 | 60 | 37.5 | 15 |
| | Azobisisobutyro-nitrile (initiator) | 1.28 | 0.8 | 0.32 | 1.28 | 0.8 | 0.32 |
| | Xylene | 50 | 50 | 50 | 50 | 50 | 50 |
| Properties | Solid content (%) | 40.0 | 39.9 | 40.1 | 39.9 | 40.0 | 40.1 |
| | Acid number | 0.3 | 0.8 | 1.2 | 0.2 | 0.4 | 0.6 |

(Note) *in solid content

SYNTHESIS EXAMPLE 4

In a flask equipped with a thermometer, a stirrer and a reflux condenser, 100 parts of xylene solution of the hydroxy group-containing fluorine-containing copolymer used in Synthesis Example 2, 0.3 part of maleic anhydride and 0.3 part of xylene were placed and reacted at 50° C. for 1 hour and at 100° C. for 2 hours to yield a fluorine-containing resin solution (solid content 50%) having reactive double bonds in an amount of 0.006 mole per 100 g of the resin. The resin solution had a hydroxyl number of 23 and an acid number of 4.

SYNTHESIS EXAMPLE 5

The hydroxyl group-containing fluorine-containing copolymer solution (solid content 50%) used in Synthesis Example 3 in an amount of 100 parts, 0.3 part of maleic anhydride and 0.3 part of xylene were reacted in the same manner as described in Synthesis Example 4 to yield a fluorine-containing resin solution (solid content 50%) having reactive double bonds in an amount of 0.006 mole per 100 g of the resin. The resin solution had a hydroxyl number of 21 and an acid number of 1.5.

EXAMPLES 1 to 6, COMPARATIVE EXAMPLES 1 to 6

In a flask equipped with a thermometer, a stirrer, a nitrogen introducing pipe and a reflux condenser, the ingredients listed in Tables 1 and 2 were placed, respectively, and heated at 100° C. for 6 hours with stirring in a nitrogen stream, followed by addition of 0.5 part of The copolymer solutions obtained in Examples 1 to 6 and Comparative Examples 1 to 6, a xylene solution (solid content 50%) of the hydroxyl group-containing fluorine-containing copolymer used in Synthesis Example 2 [Comparative Example 7], and a xylene solution (solid content 50%) of the hydroxyl group-containing fluorine-containing copolymer used in Synthesis Example 3 [Comparative Example 8] were subjected to the following tests.

(1) Accelerated Weathering Test (i) Each solution was adjusted with toluene to have a solid content of 30% and coated on a bonderite #144 treated soft steel plate (mfd. by Japan Test Panel Co. Ltd.) with a bar coater so as to make the film thickness 30 μm. After setting for 20 minutes, the coated film was dried at 80° C. for 20 minutes to give a test plate.

(ii) Using a Q-UV Accelerated Weathering Tester (mfd. by Q-Panel Co., U.S.A.), the test plate thus prepared was exposed to cycling conditions of UV irradiation at 50° C. for 4 hours - moisture condensation at 50° C. for 4 hours in each one cycle for predetermined time and the surface gloss was measured on 60° gloss meter.

(2) Pigment Dispersibility Test

Each solution in an amount of 50 parts (as the solid content) was mixed with 3 parts of carbon black and kneaded with a three-roll mill until the particle size measured by a grindometer became 10 μm or less. Then, the coating composition thus adjusted was allowed to stand at room temperature for 7 days to observe the separation (sedimentation).

(3) Resin Outer Appearance Test

(i) Solution State

A graft copolymer solution was placed in a 300-ml glass-made beaker and the state of the resin solution at 23° C. was observed by the naked eye to measure transparency.

(ii) Film State

Each solution was flow coated on a glass plate, subjected to setting for 20 minutes and dried at 108° C. for 3 hours. The state of resin film at 23° C. was observed by the naked eye to measure transparency.

The results are as shown in Table 3.

TABLE 3

|  |  | Example No. |  |  |  |  |  | Comparative Example No. |  |  |  |  |  |  |  |
|---|---|---|---|---|---|---|---|---|---|---|---|---|---|---|---|
|  |  | 1 | 2 | 3 | 4 | 5 | 6 | 1 | 2 | 3 | 4 | 5 | 6 | 7 | 8 |
| Resin outer appearance | Solution | Transparent |  |  |  |  |  | Transparent |  |  |  |  |  |  |  |
|  | Film | Transparent |  |  |  |  |  | Turbid |  |  |  |  |  | Transparent |  |
| Accelerated weathering | Initial gloss (%) | 87 | 86 | 84 | 85 | 83 | 82 | 83 | 81 | 80 | 81 | 80 | 79 | 80 | 79 |
|  | Gloss after 1000 hrs (%) | 81 | 83 | 83 | 79 | 80 | 81 | 75 | 77 | 78 | 75 | 76 | 77 | 80 | 79 |
|  | Gloss after 2000 hrs (%) | 70 | 75 | 79 | 68 | 73 | 77 | 60 | 68 | 73 | 59 | 66 | 72 | 79 | 78 |
| Pigment dispersibility | Separation (sedimentation) state | No separation |  |  |  |  |  | Slightly separated |  |  |  |  |  |  |  |

The graft copolymer produced by the process of this invention can be used as a raw material for coating compositions, which can form a coating film with excellent weather resistance. The graft copolymer per se is excellent in transparency and pigment dispersibility.

What is claimed is:

1. A process for producing a graft polymer useful as raw material of coating compositions having excellent transparency and pigment dispersibility which comprises polymerizing 99.5 to 0.5% by weight of an ethylenically unsaturated monomer (B) in the presence of 0.5 to 99.5% by weight of a fluorine-containing resin (A) having reactive double bonds via a urethane linkage, the amount of said double bonds being 0.001 to 0.025 mole per 100 g of the resin (A) and said fluorine-containing resin (A) being obtained by reacting a fluorine-containing copolymer having hydroxyl groups derived from a hydroxyalkyl vinyl ether, an isocyanate compound having two or more isocyanate groups and a hydroxyl group-containing ethylenically unsaturated monomer.

2. A process according to claim 1, wherein the fluorine-containing copolymer having hydroxyl groups has a hydroxyl number of 0.57 to 250 and a fluorine content of 1 to 60% by weight.

3. A process according to claim 1, wherein the ethylenically unsaturated monomer (B) is at least one member selected from the group consisting of methyl acrylate, ethyl acrylate, butyl acrylate, isopropyl acrylate, 2-ethylhexyl acrylate, methyl methacrylate, ethyl methacrylate, butyl methacrylate, isopropyl methacrylate, 2-ethylhexyl methacrylate, styrene, vinyltoluene, α-methylstyrene, chlorostyrene, acrylonitrile, methacrylonitrile, vinyl chloride, vinyl acetate, dimethyl maleate, 2-hydroxyethyl acrylate, 2-hydroxypropyl methacrylate, 2-hydroxypropyl acrylate, 2-hydroxypropyl methacrylate, monoacrylate of glycerin, monomethacrylate of glycerin, monoacrylate of trimethylolpropane, monomethacrylate of trimethylolpropane, N-methylolacrylamide, and N-methylolmethacrylamide.

4. A process according to claim 1, wherein the ethylenically unsaturated monomer (B) is methyl methacrylate.

5. A process according to claim 1 wherein the ethylenically unsaturated monomer (B) is at least one member selected from the group consisting of an alkyl acrylate and an alkyl methacrylate.

6. A process for producing a graft polymer which comprises a polymerizing 99.5 to 0.5% by weight of an ethylenically unsaturated monomer (B) in the presence of 0.5 to 99.5% by weight of fluorine-containing resin (A) having reactive double bonds via a rethane linkage, the amount of said double bonds being 0.001 to 0.025 mole per 100 g of the resin (A) and said fluorine-containing resin (A) being obtained by reacting a fluorine-containing copolymer having hydroxyl groups, an isocyanate compound having two or more isocyanate groups and a hydroxyl group-containing ethylenically unsaturated monomer, the fluorine-containing copolymer having a hydroxyl number of 0.57 to 250 and a fluorine content of 1 to 60% by weight and being a copolymer containing as essential components a fluoro-olefin, a hydroxy alkyl vinyl ether and an alkyl vinyl ether or a cycloalkyl vinyl ether.

7. A process according to claim 6, wherein in the fluorine-containing copolymer having hydroxyl groups, the fluoro-olefin is contained in an amount of 40 to 60% by mole, the hydroxy alkyl vinyl ether is in an amount to provide the hydroxyl number of 0.57 to 250 and the cyclohexyl vinyl ether or the alkyl vinyl ether is in an amount of 5 to 45% by mole, respectively.

8. A process according to claim 6, wherein the ethylenically unsaturated monomer (B) is at least one member selected from the group consisting of methyl acrylate, ethyl acrylate, butyl acrylate, isopropyl acrylate, 2-ethylhexyl acrylate, methyl methacrylate, ethyl methacrylate, butyl methacrylate, isopropyl methacrylate, 2-ethylhexyl methacrylate, styrene, vinyltoluene, α-methylstyrene, chlorostyrene, acrylonitrile, methacrylonitrile, vinyl chloride, vinyl acetate, dimethyl maleate, 2-hydroxyethyl acrylate, 2-hydroxyethyl methacrylate, 2-hydroxypropyl acrylate, 2-hydroxylpropyl methacrylate, monoacrylate of glycerin, monomethacrylate of glycerin, monoacrylate of trimethylolpropane, monomethacrylate of trimethylolpropane, N-methylolacrylamide and N-methylolmethacrylamide.

9. A process according to claim 6, wherein the ethylenically unsaturated monomer (B) is methyl methacrylate.

10. A process according to claim 6, wherein the ethylenically unsaturated monomer (B) is at least one member selected from the group consisting of an alkyl acrylate and an alkyl methacrylate.

* * * * *